May 10, 1949.   T. B. FORD, JR   2,469,719
PRESSURE REDUCING VALVE
Filed Aug. 27, 1947

Inventor
Thomas B. Ford, Jr.
By
Harry Jacobson
Attorney

Patented May 10, 1949

2,469,719

UNITED STATES PATENT OFFICE 2,469,719

PRESSURE REDUCING VALVE

Thomas B. Ford, Jr., Fair Haven, N. J.

Application August 27, 1947, Serial No. 770,813

13 Claims. (Cl. 277—65)

This invention relates to pressure reducing valves for reducing the outlet pressure of fluids supplied to the valve at a higher pressure, and is particularly concerned with the balanced type of such pressure reducing valves.

Such valves are frequently used in the water supply systems of tall buildings or those having multiple installations of fluid operated fixtures or apparatus, such as hotels, office buildings, hospitals and the like, to cushion the apparatus against sudden pressure shocks and to assure adequate discharge service of fluid at substantially constant reduced-pressure on every floor and at each fixture. Such valves are also employed to maintain substantially constant outlet pressure in spite of variations in the inlet pressure in such lines conducting fluid as steam, air, oil and other fluids, and usually include a spring-pressed diaphragm or piston.

Springs are objectionable not only because of their bulk and the consequent cost of the larger housings and supports required therefor, but also because of the difficulty of accurately adjusting the position of the piston indirectly through the spring to obtain the exact outlet pressure and flow desired, the friction between the spring and the adjusting member militating against accuracy.

Also, in pressure reducing valves heretofore known, replacement or repair of the spring or of any other part of the valve, necessitates shutting off of the supply of fluid, and a separate shut-off valve has heretofore been required in the line for that purpose.

This invention therefore contemplates the provision of a simple, efficient and relatively inexpensive automatic pressure reducing valve devoid of springs but nevertheless provided with a durable, solid and inexpensive member of little thickness and occupying little space, for cushioning and limiting the movement of the piston to a balanced position and taking up shocks resulting from changes in inlet or outlet pressures.

The invention further contemplates the provision of means cooperating with the cushioning means for readily adjusting and maintaining constant the maximum or the minimum fluid outlet pressure delivered by the valve by limiting the maximum valve opening or the minimum valve opening as desired.

The invention further contemplates the provision of a yieldable cushioning member of rubber or the like material moving with or arranged in the path of the piston of a balanced pressure reducing valve devoid of springs, and also adapted for valves designed for substantially constant inlet pressure or for those designed for variable inlet pressure.

The invention further contemplates the provision of a combined pressure reducing and shut-off valve utilizing a single valve body and a single partition but having a double seat, whereby the pressure reducing parts may be removed, repaired or replaced while the fluid supply is cut off in the same valve, and with resulting economies in bulk and in the time and materials required for making parts and connections.

The various objects of the invention will be clear from the description which follows and from the drawings, in which Fig. 1 is a vertical sectional view of one form of the combined pressure reducing and shut-off valve, the reducing valve being shown as of the constant inlet pressure type, showing in dash-dot lines the extreme closed positions of the valve discs and the corresponding position of the adjusting screw.

Figure 1:
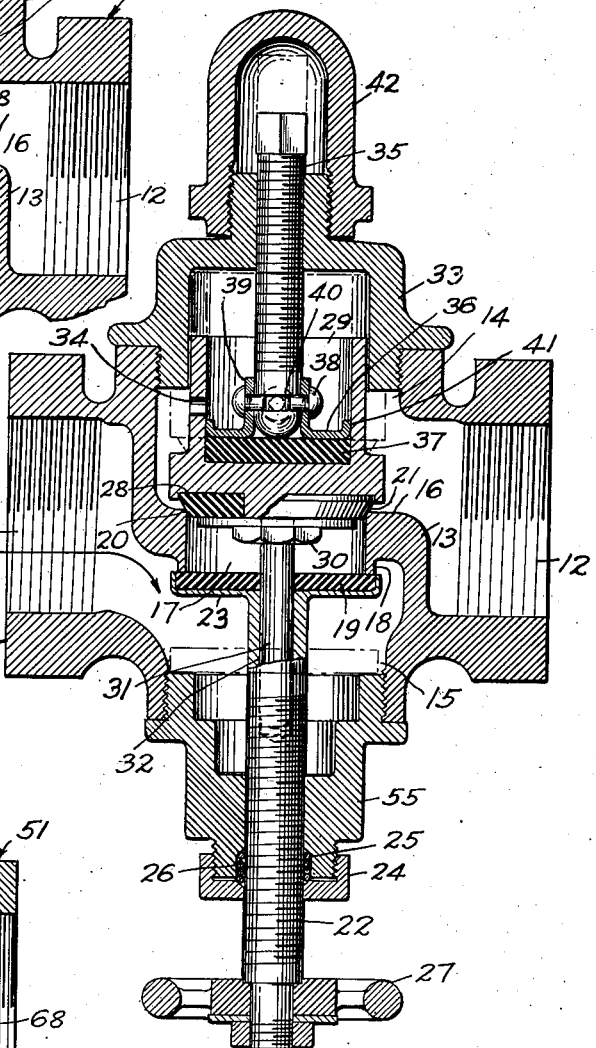

In the practical embodiment of the invention shown by way of example and referring to particularly to Fig 1, the valve body 10 is provided with an inlet 11, an outlet 12, a single partition 13, a top opening 14 intermediate the openings 11 and 12 for the reception of the pressure reducing parts, and a bottom opening 15 aligned with the opening 14 for the reception of the shut-off parts of the valve. The horizontal portion 16 of the partition is apertured as at 17 to control communication between the inlet and the outlet and also between the inlet and the opening 14. At the under side of the portion 16 of the partition, the valve seat 18 surrounds the generally cylindrical aperture 17 and is adapted to engage the shut-off valve disc 19 on the infrequent occasions when the supply of fluid is to be shut off. At the other or upper side of the partition 16, is provided the slightly conical valve seat 20 surrounding the aperture and adapted to engage the pressure reducing valve disc 21, whereby a double valve seat is formed on the single partition portion 16. Preferably, the valve seats are coaxially arranged and aligned with each other and are made of any suitable material such as tough rubber, fiber or the like.

To manipulate the shut-off valve disc 19, the valve stem 22 is provided. Said stem terminates at its upper end in a cup-shaped washer or disc holder 23 receiving the disc 19, the stem being screwed through and movable axially of the lower bonnet 55, which is in turn screwed into the opening 15 of the valve body. The nut 24 around the stem engages the bonnet and serves to compress the packing 25 in the stuffing box 26 of the bonnet to prevent leakage. When the stem is rotated as by means of a suitable hand wheel 27 secured to the lower end thereof, the disc 19 is moved toward and from its seat, thereby to open and to close communication between the inlet and the outlet 12 as well as the opening 14 when desired.

The pressure reducing parts of the valve will now be described. The conical valve disc 21 is secured in the recess 28 on the under side of the piston 29 by means of the nut 30 screwed on the downwardly extending guide rod 31 depending from the piston. Said rod slides in the longitudinal axial opening 32 of the stem and guides the piston in its movement. The upper portion of the piston is preferably hollow and is loosely and slidably fitted into the upper bonnet 33 whereby fluid is enabled to pass the piston and to fill the bonnet and the interior of the piston when the valve discs are unseated. To insure this result, one or more holes as 34 may be made through the piston to provide communication between the exterior and the interior thereof whereby the fluid under pressure may act properly on both ends of the piston to move it to a balanced position.

As has been hereinbefore indicated, means are provided for adjusting the position of the piston in the bonnet 33 to space the piston properly from its seat and thereby to reduce to the required amount, the outlet pressure and flow of fluid passing through the valve. Incorporated with said means is a resilient and yieldable member expanding and contracting under the variable forces acting thereon through the piston during certain parts of the piston movement.

As shown in Fig. 1, said means takes the form of an adjusting screw 35 in screwed engagement with the bonnet and carrying a preferably cupped washer 36 at the lower end thereof, the washer being urged into pressed contact with the cushion 37 firmly set into the lower part of the interior of the piston and against the closed lower end thereof. To insure such connection of the adjusting screw with the washer that the screw cannot become accidentally detached from the washer when rotated, the pins 38 are secured in and pass through spaced apart points in the upstanding sleeve 39 of the washer and enter the annular groove 40 of the screw. The rim 41 of the washer may be extended upwardly if desired in contact with the inner surface of the piston to aid in guiding the piston during its movement.

The cushion 37 is preferably of suitable yieldable and durable material such as rubber or the like and of sufficient thickness, while occupying little space, to contract under excessive valve opening pressure on the piston, as when the supply to a fixture communicating with the outlet is suddenly opened, the cushion expanding when released of the pressure. The thickness of the cushion is very much less than the length of the piston or the length of the adjusting screw, whereby the bonnet 33 may be made relatively short with the consequent savings in bulk, material and cost over the bonnet required for a spring. It will be seen that shocks resulting from sudden opening and closing of a fixture such as a faucet, shower or toilet flush valve or other apparatus, are not communicated to the fixture, but are absorbed by the cushion and the valve parts, while an adequate supply of fluid to the fixtures is automatically assured. Furthermore, by the use of the cushion 37, the adjustment of the screw 35 can be accurately controlled and maintained in a manner not possible with a spring, and the reduced outlet pressure and flow held constant within narrow limits for the life of the cushion. A suitable guard as 42 on the bonnet 33 protects the adjusting screw from unauthorized tampering.

Figure 2:
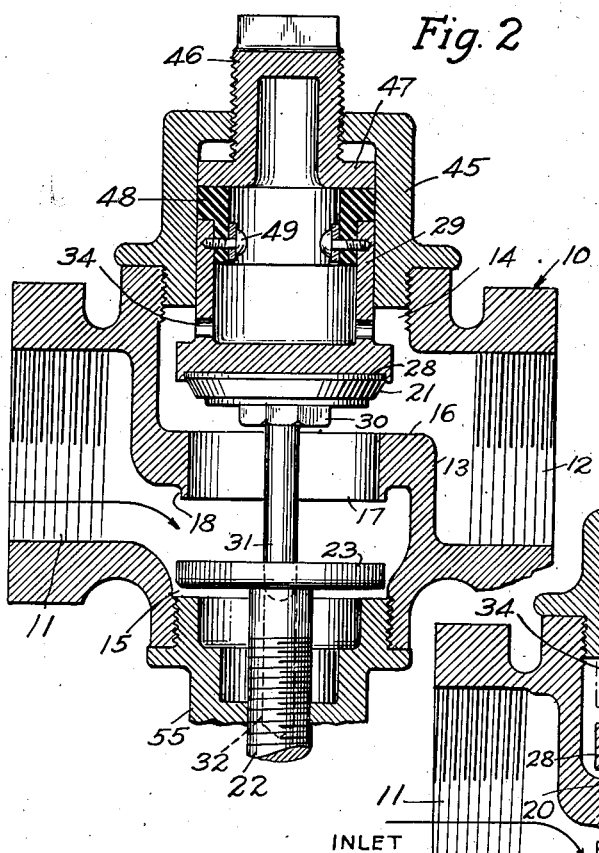
Fig. 2 is a similar view of a modified form of the combined valve of the same type employing a somewhat different adjusting and cushioning means and showing the valve discs open.

In Fig. 2, a somewhat different form of the adjustment and cushion is shown, though applied to the same type of constant supply pressure and balanced reducing valve as in Fig. 1 combined with a shut-off valve. As shown, the bonnet 45 carries the hand adjusted screw plug 46, which screws through the bonnet into position to limit the upward movement of the piston 29, being provided with a bottom flange 47 for that purpose. The cushion 48 is shown secured to the top of the piston 29 as by means of the screws 49, and also serves as a seal against the bonnet to prevent leakage of fluid therepast. Fluid enters the interior of the piston by reason of its loose fit within the bonnet and because of the holes 34 as hereinbefore described in connection with Fig. 1. It will be obvious that the cushion 48 may be secured to the flange 47 of the adjusting screw if desired in much the same manner as the valve disc 21 is secured to the piston or in any other suitable manner, or that the cushion may be in the form of a disc such as the cushion 37 or the cushion shown in Fig. 3 if found convenient.

Figure 3:
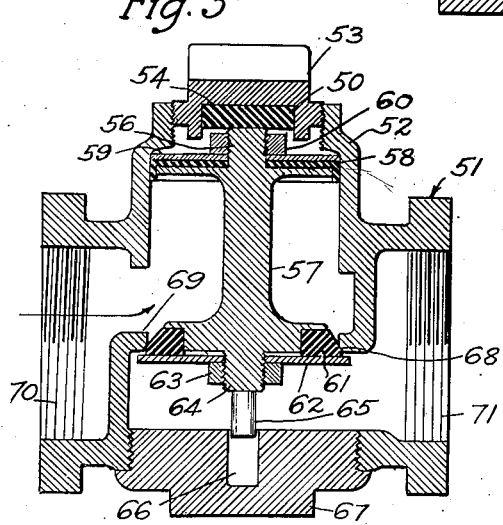
Fig. 3 is a similar view of a balanced pressure reducing valve of the variable inlet pressure type showing the invention applied thereto.

In the form of the valve shown in Fig. 3, which is adapted for variable inlet pressure, the shut-off valve parts have not been incorporated, but springs have been eliminated and a cushion 50 provided as in Figs. 1 and 2. However, the cushion expands and contracts to assist opening and to resist closing of the valve and hence not only aids in maintaining constant pressure, but has the other advantages over a spring hereinbefore set forth in detail. As shown, the valve body 51 is made of one piece with its projecting bonnet 52, into which is screwed the hand adjusted screw plug 53, the plug being shown in a position which permits complete closing of the valve. In a recess as 54 of the plug, is set the cushion 50, with the under face of which the upper end of the upstanding stud 56 of the piston 57 is normally in contact.

A cup washer as 58 is secured to the piston as by means of the flat washer 59 and the nut 60 on the stud 56 to form a leak-proof seal between the piston and the bonnet 52. At the lower end of the piston is secured the valve disc 61 as by means of the washer 62 and the nut 63 screwed on the stud 64 depending from the lower end of the piston. A rod extension 65 projecting integrally from the stud enters the opening 66 in the bottom cap 67 of the valve body, and guides the piston in its vertical movement toward and from the valve seat 68 in the apertured partition 69 of the valve body.

It will be understood that by adjusting the plug 53, the extent of the minimum valve opening is accurately determined. Fluid entering the inlet opening 70 in the direction of the arrow and under relatively high pressure, moves the piston downwardly away from the cushion 50 to the extent required to supply the correct volume of fluid at the predetermined reduced pressure to any fixture or apparatus connected to the outlet side of the valve. Should the inlet pressure increase, the piston moves upwardly to a balanced position which may cause the stud 56 to strike the cushion 50 and compressing it to absorb the shock. If the inlet pressure decreases, the piston moves downwardly, aided by the expansion of the cushion, to the balanced position required for the predetermined outlet pressure and volume.

It will now be understood that I have provided an efficient balanced pressure reducing valve devoid of springs and the disadvantages of such springs, while retaining all of the advantages and functions incident to such springs, and that by the provision of a resilient cushion absorbing the shock of piston movements, more accurate, dependable and durable adjustment of the outlet pressure is attained than is possible in a spring-pressed piston valve. It will further be understood that by the provision of a double seat on the single partition of the valve, one of the seats may be used for a suitable shut-off valve utilizing the same body as that of the pressure reducing part of the valve, and enabling the reducing valve to be disassembled and repaired when necessary without recourse to a separate and hence more expensive shut-off valve at some other point in the line.

While I have shown and described certain specific forms of the invention, it will be understook that various changes may be made therein, some of which have been indicated, without departing from the spirit of the invention as defined in the appended claims.

I claim:

1. In a fluid pressure reducing valve of the balanced piston type, a body having an inlet opening and an outlet opening, a partition in the body separating said openings and having an aperture therethrough, a valve seat on the partition surrounding the aperture, a piston movable in the body under the difference in the fluid pressures at the inlet and outlet openings, axially of and toward and from the aperture to close and to open the valve, an adjusting screw limiting the movement of the piston in one direction, a yieldable cushion interposed between the piston and the adjusting screw and arranged to be compressed therebetween when the piston reaches the limit of its path of movement in said one direction, said cushion being of lesser thickness than the length of said screw and the length of said piston and accurately determining the pressure of the fluid discharged through the outlet opening, and means for guiding the piston in its movement including a rod projecting axially from the piston and a relatively fixed member secured to the body and having an opening therein receiving and guiding an end portion of the rod.

2. A pressure reducing valve according to claim 1 wherein the cushion is carried by the piston and moves therewith.

3. A pressure reducing valve according to claim 2 wherein the piston is provided with a closed end and is otherwise hollow, and the cushion is arranged within the piston and against said closed end, the adjusting screw being rotatable independently of the cushion.

4. A pressure reducing valve according to claim 1 wherein the cushion is carried by the adjusting screw and moves therewith.

5. A pressure reducing valve according to claim 4, the piston having an axial projection thereon opposite the guide rod and adapted to engage the cushion.

6. A pressure reducing valve according to claim 1, a second valve seat surrounding the aperture of the partition and on the inlet side of the aperture, and a shut-off valve movable axially of the partition aperture into and out of engagement with the second seat to cut off the passage of fluid toward the piston.

7. A pressure reducing valve according to claim 6 in which the shut-off valve includes a rotatable valve stem having an opening therein receiving the guide rod, a threaded member on the body rotatably supporting the stem, and a valve disc carried by the stem and adapted to seat on the second valve seat.

8. In a combined pressure reducing and shut-off valve, a valve body having a partition therein provided with an aperture, a movable pressure reducing piston on one side of the aperture having a valve disc adapted to seat on one side of the partition, means for cushioning and adjusting the extent of the movement of the piston, a second valve disc on the other side of the aperture adapted to seat on the other side of the partition, and means for manipulating the second disc to open and close the aperture.

9. A combined pressure reducing valve and shut-off valve according to claim 8 wherein the cushioning and adjusting means comprises an adjusting screw threaded in the valve body and arranged coaxially of the valve discs and a yieldable disc-like cushion interposed between the piston and the screw.

10. A combined reducing valve and shut-off valve according to claim 8 wherein the valve body is provided with inlet and outlet openings, the piston being on the outlet side of the aperture and the second valve disc being on the inlet side of the aperture.

11. In a combined pressure reducing valve and shut-off valve having an inlet and an outlet, a single partition having an aperture communicating with the inlet and the outlet, a movable pressure reducing piston adapted to seat on the outlet side of the partition and a shut-off valve adapted to seat on the inlet side of the partition.

12. A combined pressure reducing valve and shut-off valve according to claim 11 including a rubber-cushioned adjusting screw for the piston.

13. The pressure reducing valve of claim 1, the adjusting screw being arranged on one side of the aperture and having the major part thereof above the piston, the relatively fixed member receiving an end portion of the rod being arranged on the other side of the aperture, the yieldable cushion being of rubber, a valve disc on the piston arranged to seat on the valve seat, and means associated with the body supporting the adjusting screw for movement axially of the aperture, the combined lengths of the piston and the adjusting screw determining the height of that part of the valve above the aperture.

THOMAS B. FORD, Jr.

REFERENCES CITED

The following references are of record in the file of this patent:

UNITED STATES PATENTS

| Number | Name | Date |
|---|---|---|
| 52,957 | Bridge | Mar. 6, 1866 |
| 754,467 | Lombard | Mar. 15, 1904 |
| 1,228,593 | Oleson | June 5, 1917 |
| 1,233,885 | Kuenhold | July 17, 1917 |
| 1,305,868 | Baun | June 3, 1919 |